United States Patent
Zhou et al.

(10) Patent No.: US 11,604,565 B2
(45) Date of Patent: *Mar. 14, 2023

(54) PERSONALIZATION OF MAP CONTENT VIA AN APPLICATION PROGRAMMING INTERFACE

(71) Applicant: GOOGLE LLC, Mountain View, CA (US)

(72) Inventors: Bailiang Zhou, Seattle, WA (US); Kenneth Richard Hoetmer, Sydney (AU); Patrick Hofmann, Darlinghurst (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,632

(22) Filed: Jul. 16, 2018

(65) Prior Publication Data

US 2018/0321811 A1 Nov. 8, 2018

Related U.S. Application Data

(63) Continuation of application No. 14/081,334, filed on Nov. 15, 2013, now Pat. No. 10,025,468.

(51) Int. Cl.
*G06F 3/0484* (2022.01)
*G06F 9/451* (2018.01)
*G06F 9/445* (2018.01)

(52) U.S. Cl.
CPC .......... *G06F 3/0484* (2013.01); *G06F 9/451* (2018.02); *G06F 9/4451* (2013.01)

(58) Field of Classification Search
CPC ....... G06F 3/0484; G06F 9/451; G06F 9/4451
(Continued)

(56) References Cited

U.S. PATENT DOCUMENTS 8,538,389 B1 * 9/2013 Evans ............... G06Q 30/02
455/414.1
10,025,468 B2 7/2018 Bailiang et al.
(Continued)

FOREIGN PATENT DOCUMENTS

WO WO-2008/148112 A1 12/2008
WO WO-2012/030902 A1 3/2012

OTHER PUBLICATIONS

"Bringing the Power of Google Earth to the Browser," (2008). Retrieved from the Internet at: URL:http://googlepress.blogspot.com/2008/05/bringing-power-of-google-earth-to_28.html.
(Continued)

*Primary Examiner* — Dino Kujundzic
*Assistant Examiner* — Jianmei F Duckworth
(74) *Attorney, Agent, or Firm* — Marshall, Gerstein & Borun LLP (57) ABSTRACT

A mapping API provides a digital map via a user interface of a computing device. When invoked by a software application, the mapping API is configured to receive an identifier of a user operating the software application, provide a first interactive digital map including a representation of a certain geographic area for display by the software application, where the first interactive digital map is personalizable via the software application, receive personalization content from the user via the software application, and cause a second digital map including a representation of the geographic area, when provided to the same user, to be modified in view of the personalization content, where the first digital map and the second digital map are created independently.

20 Claims, 3 Drawing Sheets

(58) Field of Classification Search
USPC .......................................................... 715/744
See application file for complete search history.

(56) References Cited

U.S. PATENT DOCUMENTS

| | | | |
|---|---|---|---|
| 2007/0143345 A1* | 6/2007 | Jones | G06F 16/288 |
| 2007/0210937 A1 | 9/2007 | Smith et al. | |
| 2008/0238941 A1 | 10/2008 | Kinnan et al. | |
| 2008/0301643 A1* | 12/2008 | Appleton | G06Q 30/02 |
| | | | 717/124 |
| 2009/0235285 A1 | 9/2009 | Kim et al. | |
| 2011/0177845 A1 | 7/2011 | Fasold | |
| 2011/0197200 A1* | 8/2011 | Huang | G06F 16/29 |
| | | | 719/313 |
| 2011/0227699 A1 | 9/2011 | Seth et al. | |
| 2013/0218454 A1 | 8/2013 | Kim et al. | |

OTHER PUBLICATIONS

"Google Earth User Guide," (2007). Retrieved from the Internet at: URL:http://static.goooleuserconent.com/media/earth.google.com/en/userguide/v4/google_earth_user_guide.pdf.

"Google Maps Android API v2 Different Operation," (2013).

"Make a Store Locator user Google Maps," BatchGeo (2012). Retrieved from the Internet at: URL:http://batchgeo.com/features/store-locator.

European Search Report for Application No. 14862844.9, dated May 16, 2017.

International Preliminary Report on Patentability for Application No. PCT/US2014/065404, dated May 17, 2016.

International Search Report and Written Opinion for Application No. PCT/US2014/065404, dated Feb. 19, 2015.

Lifehacker, "How to Prevent YouTube from Keeping a Record of the Videos You Watch," (2012). Retrieved from the Internet on Nov. 7, 2013: URL:http://lifehacker.com/5886904/how-to-prevent-youtube-from-keeping-a-record-of-the-videos-you-watch.

Monti, "Google Maps Basics," (2010).

Notification of First Office Action for Chinese Application No. 201480062563.1, dated May 3, 2018.

Youtube, "How to Delete Watch History on Youtube—2013," (2013). Video no longer available. URL:http://www.youtube.com/watch?v=fSYWyT3iWxE.

Notification of Second Office Action for Chinese Application No. 201480062563.1, dated Nov. 27, 2018.

* cited by examiner

PERSONALIZATION OF MAP CONTENT VIA AN APPLICATION PROGRAMMING INTERFACE

CROSS-REFERENCE TO RELATED APPLICATION

This application is a continuation of U.S. patent application Ser. No. 14/081,334, filed Nov. 15, 2013; the disclosure of which is incorporated herein by reference in its entirety for all purposes.

FIELD OF THE DISCLOSURE

The present disclosure relates to interactive digital maps and, more particularly, to personalizing interactive digital maps using an application programming interface (API).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a variety of computing devices, including many portable devices, support software applications that display interactive digital maps. For example, a user may operate a web browser to visit a web site maintained by a map service provider to view an interactive digital map of a certain geographic area.

Some map service providers allow registered users to personalize digital maps by adding markers at their favorite locations, drawing lines or shapes, specifying style preferences, activating certain "layers" of data (e.g., traffic, weather) and deactivating other layers, etc. After personalizing a map via the web site of the map service provider, a registered user can access the web site at a later time and view the personalized map content in addition to, or instead of, the standard map content.

In addition to displaying digital maps via a dedicated web site, a map service provider can provide a special-purpose software application ("mapping application") developed specifically to display digital maps. A mapping application can run on a personal computer, a table computer, a smartphone, etc. Moreover, a map service provider can provide an application programming interface (API) for embedding an interactive digital map in a third-party web page. For example, a restaurant owner can create a web site that displays a menu, the hours of operation, etc. and also embeds a digital map in the web site using the API to indicate the location the restaurant. However, a user who personalized the digital map of a certain geographic area via the web site of the map service provider cannot access her personalized content when a third-party web site displays a digital map of the same geographic area using an API of the map service provider.

SUMMARY

The techniques of the present disclosure allow users to personalize digital maps and access personalized map content using various software applications of when viewing various forms of digital content. More particularly, an application programming interface (API) can be invoked in various software applications, including web browsers, to display a digital map that includes (at least in part) a depiction of a certain geographic area and receive personalization content, such as location markers and ratings of places of interest. The API stores the personalization content so that another instance of the API can retrieve the personalization content when invoked for the same user. Moreover, an instance of the API can share personalization content not only with other instances of the API, but also with a special-purpose software application dedicated to displaying digital maps and a web site maintained by the map service provider.

In one embodiment of these techniques, a non-transitory computer-readable medium stores instructions that implement an API for providing a digital map via a user interface of a computing device. The API, when invoked by a software application executed by one or more processors, is configured to (i) receive an identifier of a user operating the software application, (ii) provide a first interactive digital map that includes a representation of a certain geographic area for display by the software application, where the first interactive digital map is personalizable via the software application, (iii) receive personalization content from the user via the software application, and (iv) cause a second digital map that includes a representation of the geographic area, when provided to the same user, to be modified in view of the personalization content, where the first digital map and the second instance digital map are created independently.

In another embodiment, a method for personalizing interactive digital maps includes providing, by one or more computing devices, a first digital map including a representation of a certain geographic area to a user. The method further includes receiving, by the one or more computing devices, personalization content which the user applied to the first the digital map and storing the personalization content in a computer-readable memory. Still further, the method includes providing, by the one or more computing devices, a second digital map of the geographic area including the representation of the geographic area to the user, including modifying the second digital map in accordance with the personalization content, such that at least one of the first digital map and the second digital map is provided in response to a software application invoking an API for providing digital maps of certain geographic areas, and where the first digital map and the second digital map are created independently.

In yet another embodiment, a server operates on a communication network to provide, a software for generating interactive digital maps to client devices. The server includes one or more processors, a non-transitory computer-readable medium, and first instructions stored on the computer-readable medium that implement a mapping API. The mapping API, when invoked by a software application as a first instance, is configured to (i) receive an identifier of a user operating the software application, (ii) generate a first interactive digital map including a representation of a certain geographic area for display by the software application, (iii) personalize the first interactive digital map in accordance with personalization content received from the user via the software application, and (iv) store the personalization content for access by a second instance of the API, where the second instance of the API personalizes a second interactive digital map that includes the representation of the geographic area in accordance with personalization content, when the second interactive digital map is provided to the same user. The server further includes second instructions stored on the computer-readable medium that, when executed on the one or more processors, provide the first instructions to a client device via the communication network.

DETAILED DESCRIPTION

Figure 1:
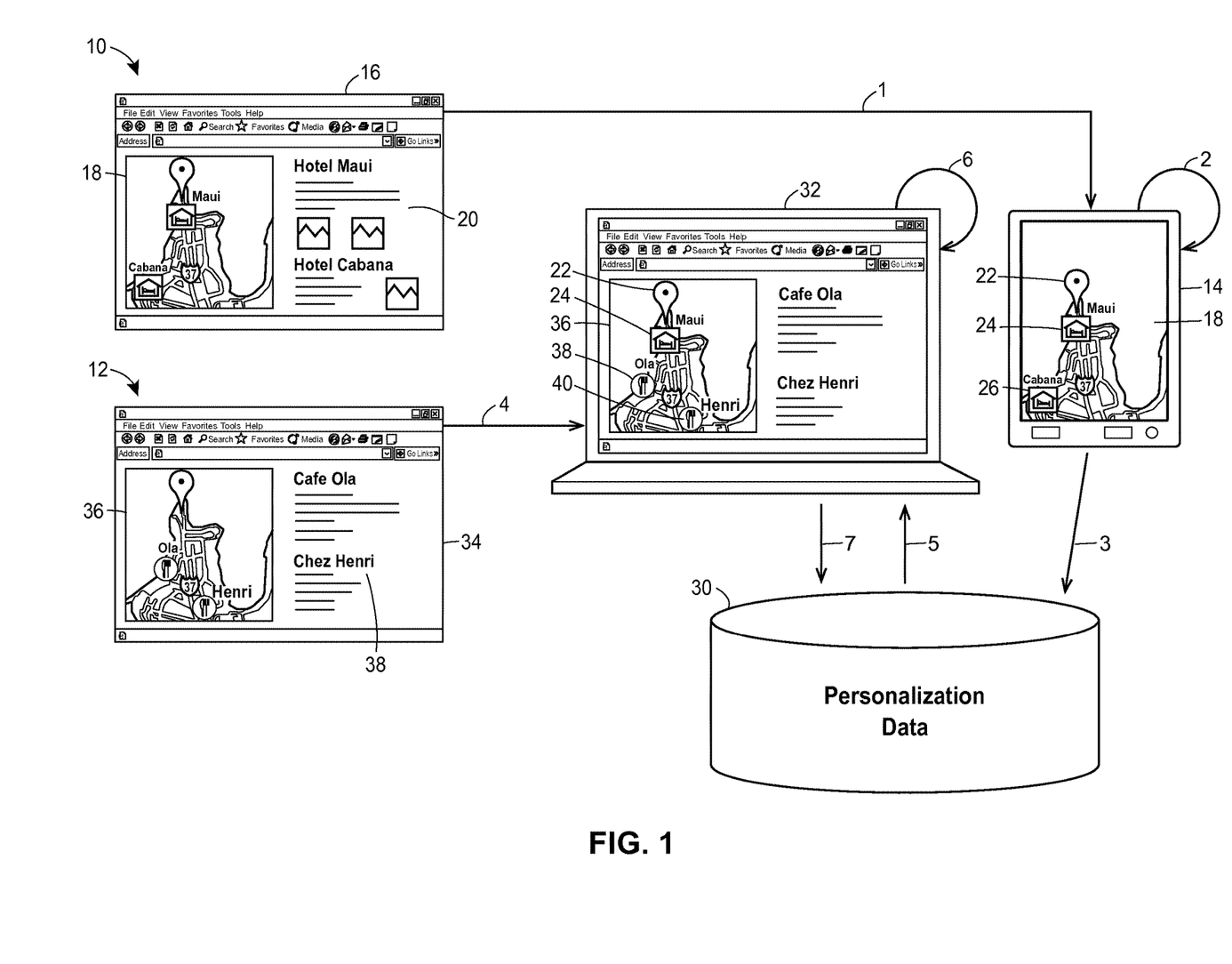
FIG. 1 schematically illustrates the exchange of personalized content between multiple interactive digital maps including representations of a certain geographic area, in accordance with the techniques of the present disclosure.

FIG. 1 schematically illustrates techniques for sharing personalization content between multiple interactive digital maps using a mapping API. More specifically, FIG. 1 illustrates an example sequence of events 1-7 in relation to several interactive digital maps. An example system in which these techniques can be implemented is then discussed with reference to FIG. 2.

In the example scenario of FIG. 1, a user visits two web pages maintained by two different third-party content providers 10 and 12, both of which include respective interactive digital maps. Both digital maps can include respective representations of a certain geographic area, at the same zoom level or at different zoom levels. The provider 10 in this example is a hotel booking service. The web page 16 accordingly provides hotel booking information 20 including location, price, availability, ratings, etc. The content on the web page 16 also includes instructions that invoke the mapping API to embed an interactive digital map 18. As discussed in more detail below, a map service provider allows various web pages and software applications to obtain map data from an online repository using the mapping API that includes one or several functions, data structures, constants, etc.

The user first uses a tablet computer 14 to visit a web page 16 of the provider 10 (event 1). However, prior to visiting the web page of the providers 10, the user operates a web browser on the tablet computer to provide log-in data to the map service provider. For example, the user can visit a web page maintained by the map service provider specifically for online map services or a broader set of services (e.g., search, email, picture and video hosting). In any case, the user can establish an active session with the map service provider so that the web browser on the tablet computer 14 can store and utilize user authentication information (e.g., an active session key) when interacting with web sites that invoke the mapping API. It is noted some embodiments may require that, in order for the web browser to use this information when interacting with third-party web sites, the user select certain settings and/or install certain applications.

When the tablet computer 14 receives content for displaying the web page 16 from the provider 10, the web browser operating on the tablet 14 invokes an instance of the mapping API to retrieve map data from the map service provider in order to display the embedded interactive digital map 18, in accordance with the corresponding instructions in the received content. In this example, the received content invokes the mapping API with a set of parameters that specify that the digital map should be centered at the location represented by marker 22, that the zoom level should be 14, and that initially only the basic map layer should be activated. Further, the received content can specify, via the mapping API, that hotel markers 24 and 26 should be overlaid on the digital map 18 at specified locations. Still further, the web browser determines that the valid user authentication information is available and provides this information to the instance of the mapping API.

Next, as represented by event 2, the user personalizes the embedded interactive digital map 18. For example, the user can long-press on the screen at or near the point of interest 24 to create his own location marker or denote a personal preference. The web browser can process the long-press event and pass the event parameters to the mapping API. In response, the mapping API can update the visualization of the digital map 18 (e.g., depict a different marker).

The mapping API also records the user's selection of a personal marker in the personalization database 30 (event 3). For example, the mapping API can format and transmit, to the map service provider, a message that specifies a location and a type of marker. In a similar manner, the mapping API can store various types of personalization content in the personalization database 30, such as home and work locations, favorite places, polylines and polygons drawn by the user, etc.

With continued reference to FIG. 1, a content provider 12 is a restaurant booking service that operates a web site 34. The web site 34 can include content 38, such as information about restaurants, as well as instructions that invoke the mapping API to create an instance of the interactive digital map 36. At this time, the user operates a laptop computer 32 rather than the tablet computer 14. Similar to the situation discussed above, the user uses a web browser on the laptop computer 32 to provide log-in data to the map service. The user then visits the web site 34 (event 4).

After the laptop computer 32 receives the content 38 for the web page 34, the web browser on the laptop 32 invokes an instance of the mapping API in accordance with the instructions in the content 38. The mapping API retrieves map data from the map service provider in order to display the embedded interactive digital map 36. In this example, the content 38 specifies approximately the same location 22, and the mapping API accordingly renders a similar map image of the geographical area surrounding the location 22. The content 38 also invokes the mapping API to overlay restaurant markers 38 and 40 on the interactive digital map 36.

Using the authentication information for the user, the instance of the mapping API invoked by the web browser on the laptop computer 32 retrieves personalization data from the personalization database 30 (event 5). The mapping API then personalizes the interactive digital map 36 in accordance with the retrieved personalization content. In particular, the mapping API processes displays the marker 24 at the location selected by the user when she operated the tablet computer 14.

Event 6 corresponds to the user further personalizing the digital map via the web browser on the portable device 32. For example, the user may "star" or "like" one of the restaurants displayed on the digital map 36. Finally, as represented by event 7, the user's interaction with the embedded interactive digital map 36 is recorded as part of the user's personalized data by the API.

Thus, as a registered and authenticated user interacts with various interactive digital maps, various instances of the mapping API share personalization content using the personalization database 30. Moreover, as discussed below, the mapping API can similarly share personalization data with other software modules configured to receive map data from the same map service provider, such as a standalone mapping software application or a web site maintained directly by the map service provider rather than a third party.

Although the digital maps on the web sites of content providers 10 and 12 depict approximately the same geographic area at the same zoom level, in general the mapping API can provide personalization content to digital maps displayed at the same or different zoom levels. Thus, for example, a user can personalize a digital map that depicts geographic area A at a relatively high zoom level, personalize another digital map that depicts geographic area B at a relatively high zoom level, and see the personalization content when viewing yet another digital map that depicts, at a relatively low zoom level, a geographic area that includes areas A and B.

Figure 2:
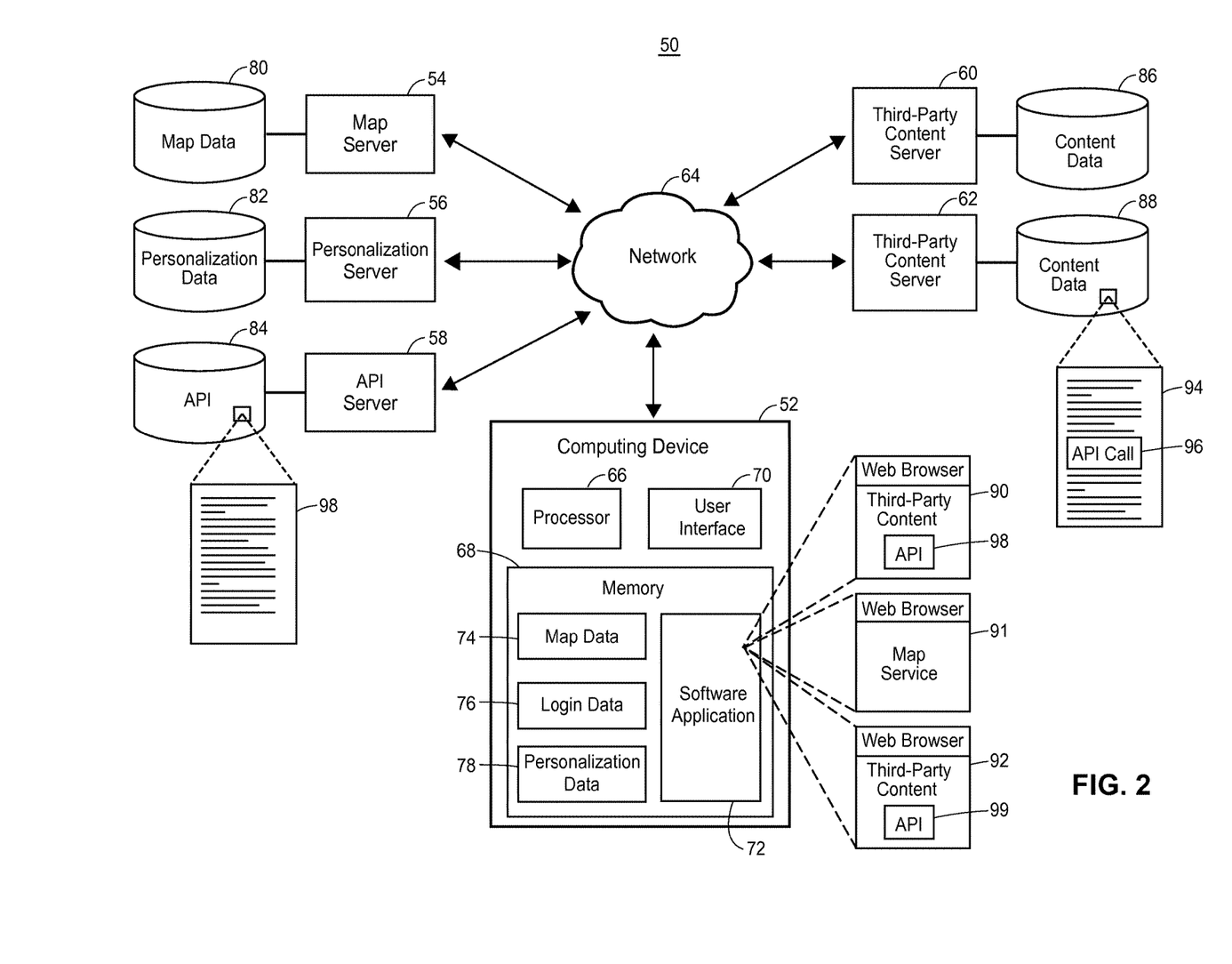
FIG. 2 is a block diagram of an example computing system in which the techniques of the present disclosure can be implemented.

Referring next to FIG. 2, an example system 50 can implement at least some of the techniques for sharing personalized content between interactive digital maps. The system 50 includes a computing device 52 coupled to a map server 54, a personalization server 56, an API server 58, and third-party content servers 60 and 62. These devices or groups of devices are interconnected via a communication network 64 that can include wired and/or wireless links. The computing device 52 can be the tablet computer 14 or the laptop computer 32 discussed above or, more generally, any suitable electronic device that includes an interface for displaying digital maps.

In an example implementation, the computing device 52 includes one or more processors 66 such as central processing units (CPUs), a computer-readable memory 68, and a user interface 70. More generally, the computing device 52 can include one or more processors and, if desired, one or more graphics processing units (GPUs) as well as other processing units. The memory 68 can be a computer-readable, tangible, non-transitory storage device and can include both persistent (e.g., a hard disk, a flash drive) and non-persistent (e.g., RAM) memory components. The memory 68 stores instructions executable on the processor 66 that make up a software application 72. In addition, the memory 68 stores map data 74, login data 76, and personalization data 78 on which the software application 72 operates.

A map service provider operates the map server 54 to provide map data 74 stored in a map database 80 to client devices for generating interactive digital maps. The personalization server 56 is coupled to a personalization database 82, which stores personalization data (e.g., the personalization data 78) for customizing interactive digital maps. The API server 58 is coupled to an API database 84 that stores instructions that implement one or several APIs. According to some implementations, the personalization server 56 and the API server 58 are also part of the map service provider associated with the map server 54. The third-party content servers 60 and 62 are coupled to content databases 86 and 88, respectively. Each of the content servers 60 and 62 may be part of a third-party content provider (e.g., a broadcaster, a retailer, a social media network, etc.). As such, each of the content databases 86 and 88 stores various content data such as graphics, text, animation, audio and video data, multimedia data, HTML, etc. In general, each of the servers 54, 56, 58, 60 and 62 may be a single computing device having a memory and a processor that executes instructions stored in the memory, a pool of such devices (each capable of processing a request for data), a group of such devices that processes requests in a distributed or non-distributed manner, etc.

The map data 74 in the memory 68 can correspond to various types of geographic data including topographical data, street data, urban transit information, traffic data, etc. The geographic data in turn may be schematic or based on photography, such as satellite imagery. The map data 74 can conform to any suitable format including a raster format and a vector graphics format, for example. Generally speaking, an image in a raster format specifies which colors are applied to various pixels that make up an image, whereas a graphic in a vector graphics format includes mathematical descriptions of points and various shapes (e.g., a line can be specified using a vector graphics format as two endpoints and an indication of thickness and color). In some implementations, if the map data 74 is in a raster format, the map data 74 may be organized into regular sized component images, or "tiles" corresponding to a certain zoom level. In other implementations, if the map data 74 is in a vector graphics format, the shapes that make up a digital map are organized according to square map tiles for convenience.

The user authentication or login data 76 provides information that indicates whether a user is logged in to the software application 72. As such, the login data 76 can include user authentication information such as a username, a login identifier, a password, a session key, etc.

The personalization data 78 may include any personalized content or data associated with or generated by the user. The personalization data 78 may be used to customize an interactive digital map so that the user can view his or her personalized content on the map. For example, the personalization data 78 may include indicators (e.g., markers, icons, labels, etc.) that identify locations favored by the user (e.g., the user's work location, the user's favorite restaurant, etc.), and the customization then involves overlaying the interactive digital map with those indicators. As another example, the personalization data 78 may include overlays that the user has created on the interactive digital map (e.g., shapes, polylines, symbols, etc.) to indicate points of interest (or areas of interest such as neighborhoods), and the customization then involves superimposing the various overlays on the interactive digital map. In yet another example, the personalization data 78 may include the user's preference for certain map layers to be displayed (e.g., traffic layer, transit layer, weather layer, etc.), and the customization then involves displaying the map layers preferred or specified by the user on the interactive digital map. In a still further example, the personalization data 78 may include the user's styling preferences (e.g., changing the visual display of such map elements as roads, parks, urban areas, etc.), and the customization then involves applying the user's styling preferences to the display of the interactive digital map.

The software application 72 may be any application capable of displaying interactive digital maps on the computing device 52 (e.g., a mapping application, a navigation application, a shopping guide application, etc.). In the implementation shown in FIG. 2, the software application 72 is a web browser. Several instances of the web browser (or different windows of a web browser) are illustrated as web browsers 90-92.

In an example scenario, the user operates the web browser 90 on the computing device 52 to communicate access the content server 62, which is associated with a third-party content provider. The web browser 90 generates and transmits a request for content data to the content server 62. In response, the content server 62 retrieves content data 94 from the content database 88, and provides the content data 94 to the web browser 90. The content data 94 may specify various information related to a third-party content provider. For example, if the content server 62 belongs to a third-party content provider such as a retailer, then the content data 94 may include information such as items offered by the retailer, operating hours of the retailer, location of the retailer, etc. Further, the content data 94 may specify an interactive digital map that displays the location of the retailer. To this end, the content data 94 include a mapping API call 96, which, when executed, invokes the instructions that implement a mapping API 98 to display an interactive digital map.

According to one implementation, the API call 96 is a link, such as a URL, that directs the web browser 90 to send a request to the API server 58 to retrieve the instructions that implement the mapping API 98 from the API database 84. Once retrieved, the mapping API 98 can proceed to request map data (e.g., the map data 74) from the map server 54. The mapping API 98 then processes the requested map data and embeds the interactive digital map in the web browser 90 for display to the user. For example, the interactive digital map may be displayed within an allocated portion of a web browser window.

The mapping API 98 can be implemented as one or several functions, a data structure, a messaging scheme, etc. Further, the mapping API 98 may include compiled code that executes directly on the processor 66 or, alternatively, instructions in a any other form such as a scripting language interpreted at runtime by the web browser 90.

The mapping API 98 can determine if the user is logged in to the web browser 90 by checking the login data 76, according to some implementations. If the login data 76 indicates that the user is logged in, the mapping API 98 can proceed to retrieve any personalization content associated with the user and customize the embedded interactive digital map in accordance with this content. To do so, the mapping API 98 can communicate with the personalization server 56. Alternatively or additionally, the personalization data 78 may already be stored in the computing device 52 and the mapping API 98 can simply process the personalization data 78 stored in the memory 68. In any event, the mapping API 98 utilizes all or part of the personalization data 78 to customize or personalize the embedded interactive digital map according to the user.

Once the personalization is complete, the user can view and interact with the embedded interactive digital map. Further, certain user interactions may be recorded by the mapping API 98 and saved as part of the personalization data 78. For example, the user may bookmark a location on the map as a point of interest for future reference. Updates or changes to the personalization data 78 may be cached in the memory 68 and/or streamed to the personalization database 82 for storage.

Still referring to FIG. 2, the user may also run the web browser 91 to communicate directly with a web site of the a map service provider that operates the map server 54. In one implementation, the web browser 91 may be a different web browser that is executed at the same as the web browser 90. In another implementation, the web browser 91 may be another instance of the web browser 90 that is executed at a later time. In yet another implementation, the web browser 91 may be in form of a tab on the web browser 90.

In any event, the web browser 91 generates and transmits a request for map data to the map server 54. The map server 54 in response provides the requested map data, and the web browser 91 renders and displays an interactive digital map.

The web browser 91 may also check the login data 76 to determine whether the user is logged in. If the login data 76 indicates that the user is logged in, then any personalized content associated with the user is synchronized and the displayed interactive digital map is customized according to information in the personalization data 78. This customization may include any user interactions with the embedded interactive digital map in the web browser 90 that were previously saved by the mapping API 98. User interactions with the interactive digital map in the web browser 91 are also saved as part of the personalization data 78.

As a further illustration, the user may run the web browser 92 to communicate with the content server 60, which is associated with another third-party content provider in which the user is interested. In general, the web browser 92 may be a different web browser that is executed at the same time as the web browsers 90 and 91, a different instance of the web browsers 90 and/or 91 that is executed at a later time, or a different tab on the either the web browsers 90 and 91.

The web browser 92 generates and transmits a request for content data to the content server 60, which in response provides content data retrieved from the content database 86 to the web browser 92. The content data from the content server 60 may be similar to the content data 94. For example, the content server 60 may belong to a third-party content provider such as a health service provider, and the content data retrieved from the content database 86 may specify various information including an embedded interactive digital map to be displayed in the web browser 92 that shows the location of the health service provider. As such, the web browser 92 invokes the mapping API, as an instance of the mapping API 99, to display the embedded interactive digital map. For clarity, separate instances of the mapping API are illustrated in FIG. 2 using separate reference numbers 98 and 99. However, it will be understood that these instances may correspond to the same set of instructions executed at two different times.

The mapping API 99 also determines whether the user is logged in to the web browser 92 by checking the login data 76. If the user is logged in, the mapping API 99 proceeds to synchronize any personalized content associated with the user and customize the embedded interactive digital map in the web browser 92 according to the user's personalization data 78. Again, this customization may include any previously saved user interactions with the embedded interactive digital map in the web browser 90 and the interactive digital map in the web browser 91. User interactions with the embedded interactive digital map in the web browser 92 are subsequently recorded by the mapping API 99 as part of the personalization data 78.

Figure 3:
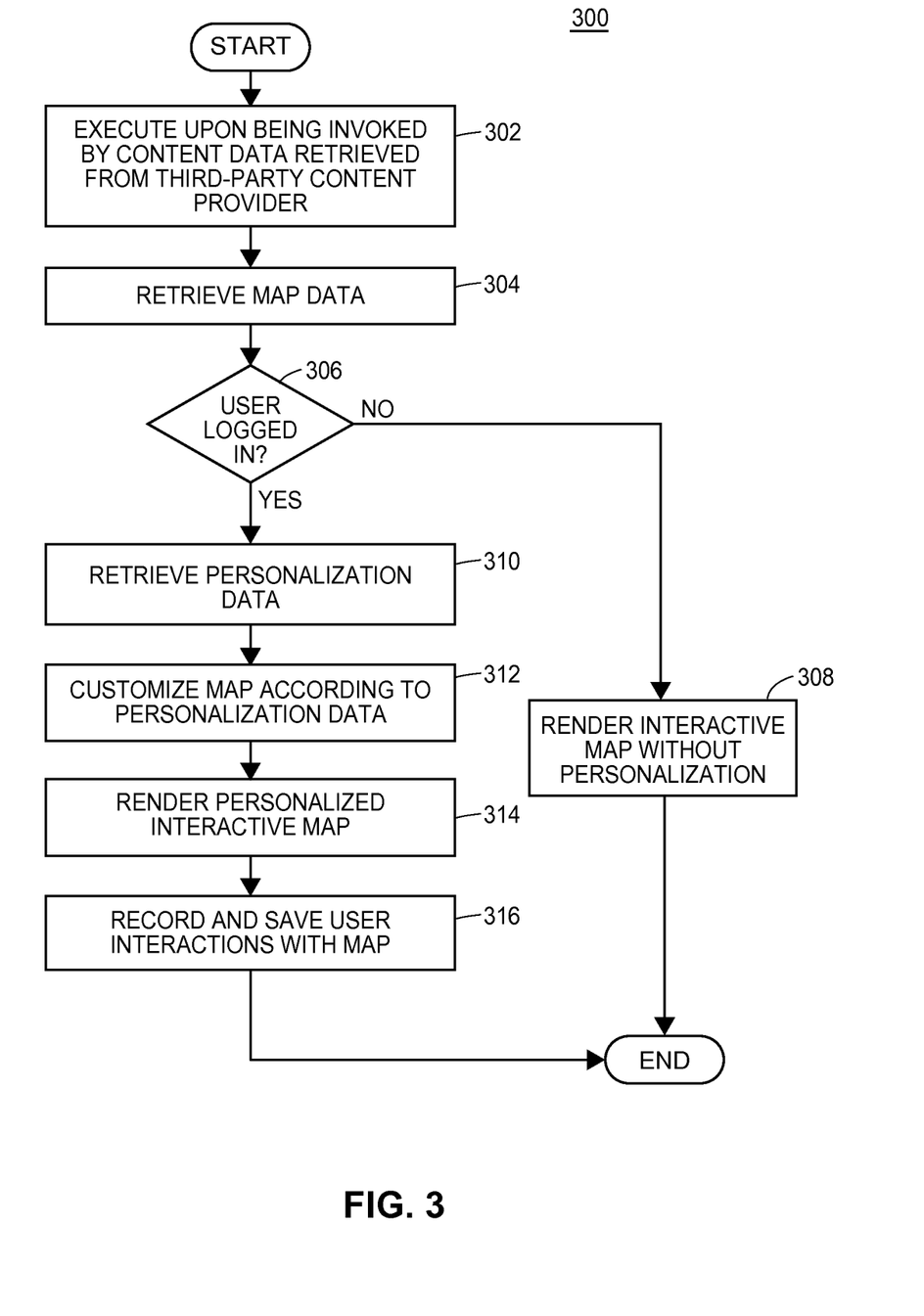
FIG. 3 is a flow diagram of an example method for synchronizing personalized content between interactive digital maps using an API.

Now referring to FIG. 3, an example method 300 for synchronizing personalized content or data between interactive digital maps using a mapping API can be implemented in a computing device such as the computing device 52, for example.

At block 302, a mapping API (e.g., the mapping API 98) is executed upon being invoked by content data (e.g., the content data 94) retrieved from a third-party content provider. The API is invoked to display an interactive digital map that may be embedded in a software application such as a web browser.

Next, at block 304, the mapping API retrieves map data from a map service provider in order to render the interactive digital map in the software application. At block 306, the mapping API determines whether a user is logged in to the software application. If the user is not logged in, then the flow proceeds to block 308 to render the interactive digital map without personalizing the map. However, if the user is logged in, then the flow proceeds to block 310.

At block 310, the mapping API retrieves personalization data associated with the user. Once retrieved, the mapping API customizes or personalizes the interactive digital map according to the personalization data at block 312. For example, the API may overlay the interactive digital map with markers that indicate various points of interest that the user has specified or saved in the personalization data.

The flow then proceeds to block 314 to render the personalized interactive digital map. Finally, at block 316, user interactions with the personalized interactive digital map are saved and recorded as part of the user's personalization data.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for sharing personalized content between instances of interactive digital maps using an API through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium storing thereon instructions that implement an application programming interface (API) for providing digital maps via user interfaces of computing devices, wherein the API is configured to:
   when invoked as a first instance by a web browser in response to instructions included in first web page content received from a first provider operating independently of a map server:
   receive authentication information for a user operating the web browser,
   provide a first interactive digital map including a certain geographic area for display by the web browser, using map data from the map server and, wherein the first interactive digital map is personalizable by the user via the web browser, and
   receive personalization content from the user via the web browser; and
   when invoked as a second instance in response to instructions included in second web page content received from a second provider operating independently of the first provider and the map server, use the authentication information to cause a second digital map including the geographic area, when provided to the same user, to be modified with the personalization content, wherein the first digital map and the second digital map are created independently, wherein the second digital map is created using map data from the map server.

2. The computer-readable medium of claim 1, wherein to cause the second digital map to be modified with the personalization content, the API applies an overlay created by the user to the second digital map, the overlay including at least one of a shape, a polyline, or a symbol.

3. The computer-readable medium of claim 1, wherein to cause the second digital map to be modified with the personalization content, the API applies styling preferences of the user to change a visual display of certain map elements.

4. The computer-readable medium of claim 1, wherein to cause the second digital map to be modified with the personalization content, the API places a marker at a location specified by the user as a part of the personalization content.

5. The computer-readable medium of claim 1, wherein to cause the second digital map to be modified with the personalization content, the API modifies the second digital map in view of a rating assigned by the user to a geographic entity depicted in the first digital map.

6. The computer-readable medium of claim 1, wherein the API is further configured to display, in the first instance, a marker to indicate a location of the first provider.

7. The computer-readable medium of claim 1, wherein the API is configured to provide the first interactive digital map at a zoom level specified by the web page content.

8. The computer-readable medium of claim 1, wherein the API is configured to transmit the personalization content to a network server via a communication network, and wherein the personalization content is retrieved from the network server to be applied to the second instance of the digital map of the geographic area.

9. The computer-readable medium of claim 1, wherein the web browser determines that the user authentication is valid for the user and provides the user authentication to the API, wherein the mapping API uses the user authentication to receive the personalization content for the user.

10. The computer-readable medium of claim 1, wherein the API is configured to store the personalization content in one or more storage devices operating in a communication network, wherein the first instance of the API and the second instance of the API are invoked on two different computing devices communicatively coupled to the one or more storage devices via the communication network.

11. The computer-readable medium of claim 1, wherein the authentication information includes a username or a login identifier.

12. The computer-readable medium of claim 1, wherein the authentication information includes a session key.

13. A method for personalizing interactive digital maps, the method comprising:
when a first instance of an application programming interface (API) is invoked by a web browser in response to instructions included in first web page content received from a first provider operating independently of a map server implemented in one or more computing devices:
providing, by the map server, a first digital map to a user in the web browser,
receiving, by the one or more computing devices, authentication information for the user,
receiving, by the one or more computing devices, personalization content which the user applied to the first digital map via the web browser,
storing the personalization content in a computer-readable memory; and
when a second instance of the API is invoked by the web browser in response to instructions included in second web page content received from a second provider operating independently of the map server and the first provider:
providing, by the one or more computing devices, a second digital map to the user, wherein the second digital map includes the geographic area and is created independently from the first digital map using map data from the map server, and
modifying the second digital map in accordance with the personalization content using the authentication information.

14. The method of claim 13, wherein storing the personalization content includes storing an overlay layer created by the user, the overlay layer including at least one of a shape, a polyline, or a symbol.

15. The method of claim 13, wherein storing the personalization content includes styling preferences of the user to change a visual display of certain map elements.

16. The method of claim 13, wherein storing the personalization content includes storing an indication of a marker placed on the first digital map at a user-specified location.

17. The method of claim 13, wherein storing the personalization content includes storing a rating assigned by the user to a geographic entity depicted in the first digital map.

18. The method of claim 13, wherein one of the first digital map and the second digital map is provided by a special-purpose software application dedicated to displaying interactive digital maps via a user interface.

19. The method of claim 13, wherein modifying the second digital map in accordance with the personalization content includes automatically applying the personalization content to the second digital map.

20. The method of claim 13, wherein modifying the second digital map in accordance with the personalization content includes automatically selecting content to be displayed as part of the second digital map in view of the personalization content.

* * * * *